April 11, 1950     R. KRANITZ     2,503,276
BAIT CONTAINER
Filed Sept. 25, 1948
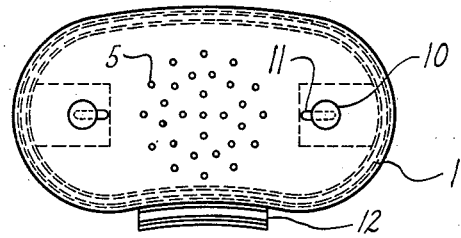
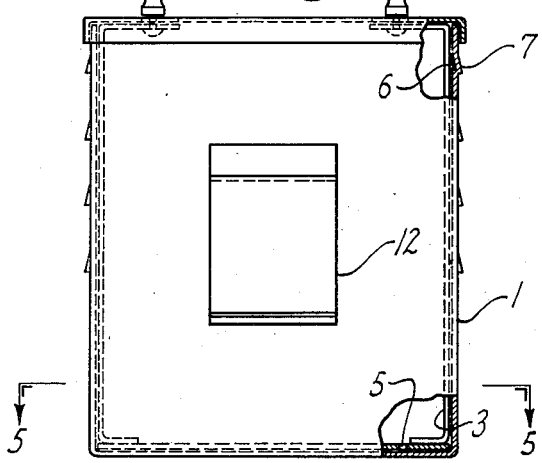
Fig. 2
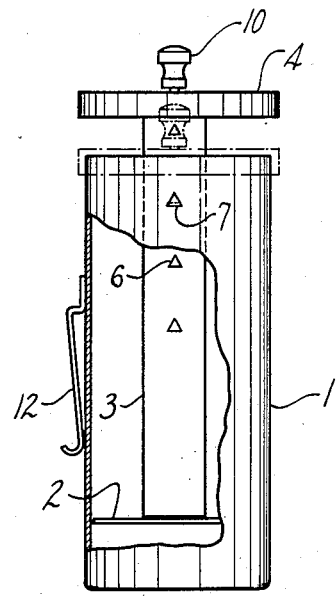
Fig. 3
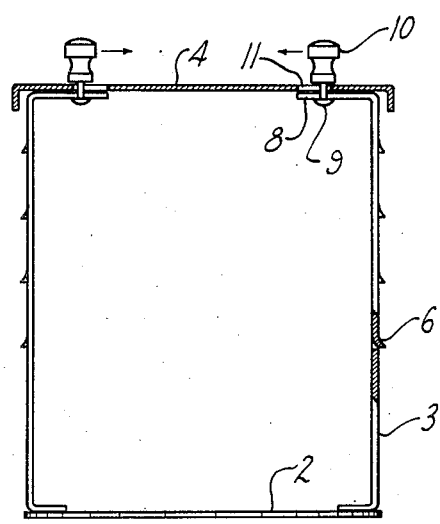
Fig. 4
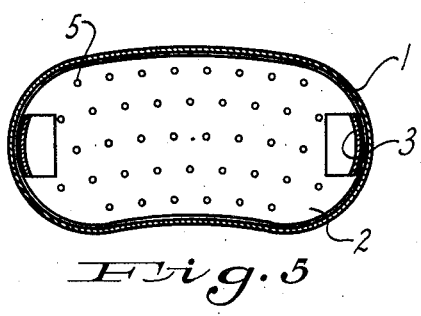
Fig. 5
INVENTOR.
Robert Kranitz
BY William B. Jaspert
Attorney.

Patented Apr. 11, 1950

2,503,276

UNITED STATES PATENT OFFICE 2,503,276

BAIT CONTAINER

Robert Kranitz, Du Bois, Pa.

Application September 25, 1948, Serial No. 51,147

3 Claims. (Cl. 43—55)

This invention relates to new and useful improvements in bait boxes for fishermen, and it is among the objects thereof to provide a bait box which is of simple, durable construction and of light weight for attachment to the belt or garment of the fisherman.

It is a further object of the invention to provide a bait structure for live bait having a movable bottom and an integrally formed closure adjustable to bring the bottom to different heights in the container to render the contents thereof accessible to the user.

The invention will become more apparent from a consideration of the accompanying drawing, constituting a part hereof, in which like reference characters designate like parts, and in which Fig. 1 is a top plan view of a live bait box or container embodying the principles of this invention;

Fig. 2 a rear elevational view thereof, partially cut away;

Fig. 3 a side elevational view partially cut away;

Fig. 4 a front elevational view of the integral base and cover member; and

Fig. 5 a longitudinal section taken along the line 5—5, Fig. 2.

In the drawing the numeral 1 designates an outer container capable of holding liquid, if desired, in which is disposed a movable bottom portion 2 having a plurality of straps 3 joined to a cover 4. The base 2 is provided with perforations 5, as shown in Figs. 2 and 5, so that when raised in the container above the water level the bait, which is supported on the bottom plate 2, is accessible. The side straps 3 are provided with upstruck portions 6 which interact with indents 7 formed in the outer wall of the container 1, as shown in Fig. 2. The tops of the straps 3 are bent inward, as shown at 8, and are provided with rivets 9 to which a button 10 is attached, the rivets 9 being slidable in slots 11 of the cover member 4.

When the bait can is filled with bait, such as live minnows or the like, liquid is maintained in the container 1, and to remove a minnow from the bait can the fisherman squeezes the two buttons 10 to retract the straps 3 which release the upstruck member 6 from the notches 7 of the container and permits the lifting of the cover and attached base 2 to bring the bait to the surface of the container for convenient removal. A plurality of indents and upstruck members are provided so that the base 2 may be brought to different heights for removal of the bait without necessitating the use of the hand for holding the cover in the raised or open position.

As shown in Fig. 5, the container 1 is of kidney shape to conform to the contour of the body when the container is fastened on a belt as by the clip 12 of Figs. 2 and 3.

It is evident from the foregoing description of the invention that bait containers therein disclosed provide a convenient way of carrying live bait particularly useful to stream fishermen, which is conveniently accessible for use without losing bait either by spilling or displacement when it is necessary to reach into the container as in conventional bait can structures.

Although one embodiment of the invention has been herein illustrated and described, it will be evident to those skilled in the art that various modifications may be made in the details of construction without departing from the principles herein set forth.

I claim:

1. A bait can comprising a fluid container open at the top and provided with indents on its side walls, a partition movably mounted in said container having straps extending against the side walls of the container, said straps being bent at right angles at the top, rivets extending upwardly from said bent portions of the straps through slots in the cover member, and gripping buttons on said rivets extending above the cover for holding the cover on said straps and for permitting retraction of said straps from the sides of the container, said straps having projections cooperating with the indents in the wall of the container for locking the straps and thereby fixing the position of the partition member to a desired height relative to the container.

2. A bait can comprising a substantially kidney-shaped container open at the top and provided with indents in its side walls, a movable partition in said container, and a cover for said container, said movable partition having a plurality of straps joined to said cover, said straps having projecting portions for interacting with the said indents in said container to secure the partition and said cover in a desired adjusted position relative to the base of the container.

3. A bait can comprising a substantially kidney-shaped container open at the top, a perforated partition movably mounted in said container on a plurality of straps, and a perforated cover secured to one end of the straps, said cover extending to seal the top of the container, said straps cooperating with the inner wall of said container to secure the partition and cover to a desired adjusted position relative to the base of the container, the cover and partition being rigidly connected by said straps.

ROBERT KRANITZ.

REFERENCES CITED

The following references are of record in the file of this patent:

UNITED STATES PATENTS

| Number | Name | Date |
|---|---|---|
| 886,335 | Balken | May 5, 1908 |
| 1,455,219 | Morina | May 15, 1923 |
| 1,680,539 | Hadi | Aug. 14, 1928 |
| 1,734,117 | Coryell | Nov. 5, 1929 |
| 1,789,773 | Rasch | Jan. 20, 1931 |